United States Patent [19]

Johnson

[11] Patent Number: 5,022,669
[45] Date of Patent: Jun. 11, 1991

[54] CHILD TRAVEL SEAT

[76] Inventor: Preston Johnson, 73-418 Pinyon St., Palm Desert, Calif. 92260

[21] Appl. No.: 543,444

[22] Filed: Jun. 26, 1990

[51] Int. Cl.<sup>5</sup> ............................................. B62B 7/12
[52] U.S. Cl. ..................................... 280/30; 280/5.24; 280/47.38; 280/47.4; 280/648; 280/650; 280/658; 280/808; 297/231; 297/467
[58] Field of Search ..................... 280/30, 47.38, 47.4, 280/647, 648, 650, 657, 658, 808, DIG. 10, 5.24; 297/230, 231, 467, 484, 191, 430, DIG. 4

[56] References Cited

U.S. PATENT DOCUMENTS

| | | | |
|---|---|---|---|
| 2,488,681 | 11/1949 | Sohn | 297/191 |
| 2,530,592 | 11/1950 | Aries | 297/DIG. 4 |
| 4,040,664 | 8/1977 | Tanaka et al. | 297/467 |
| 4,265,461 | 5/1981 | Okubo | 280/30 |
| 4,570,956 | 2/1986 | Dyer | 280/30 |
| 4,620,711 | 11/1986 | Dick | 280/30 |
| 4,632,409 | 12/1986 | Hall et al. | 280/30 |
| 4,641,844 | 2/1987 | Mar et al. | 280/30 |
| 4,762,331 | 8/1988 | Tucker et al. | 280/30 |
| 4,786,064 | 11/1988 | Baghdasarian | 280/30 |
| 4,828,281 | 5/1989 | Sanchas | 280/30 |
| 4,832,354 | 5/1989 | LaFreniere | 280/30 |
| 4,834,403 | 5/1989 | Yanus et al. | 280/30 |
| 4,852,894 | 8/1989 | Dyer | 280/30 |
| 4,872,693 | 10/1989 | Kennel | 280/30 |
| 4,874,182 | 10/1989 | Clark | 280/30 |
| 4,878,680 | 11/1989 | Molnar | 280/30 |

FOREIGN PATENT DOCUMENTS 2146957  5/1985  United Kingdom ............ 280/47.38

Primary Examiner—Andres Kashnikow
Assistant Examiner—Eric Culbreth
Attorney, Agent, or Firm—Dennison, Meserole, Pollack & Scheiner

[57] ABSTRACT

A child travel seat comprising a child receiving and restraining seat and back mounted between opposed side walls. The side walls define a base portion below the seat which mounts a series of spaced parallel wheel assemblies positioned with exposed lower peripheries along a low level arc. A pivoted handle moves between a first stored position with the handle bar nested within the wheel assemblies and a rearwardly extending upwardly angled position for manipulation of the travel seat as a stroller.

18 Claims, 4 Drawing Sheets

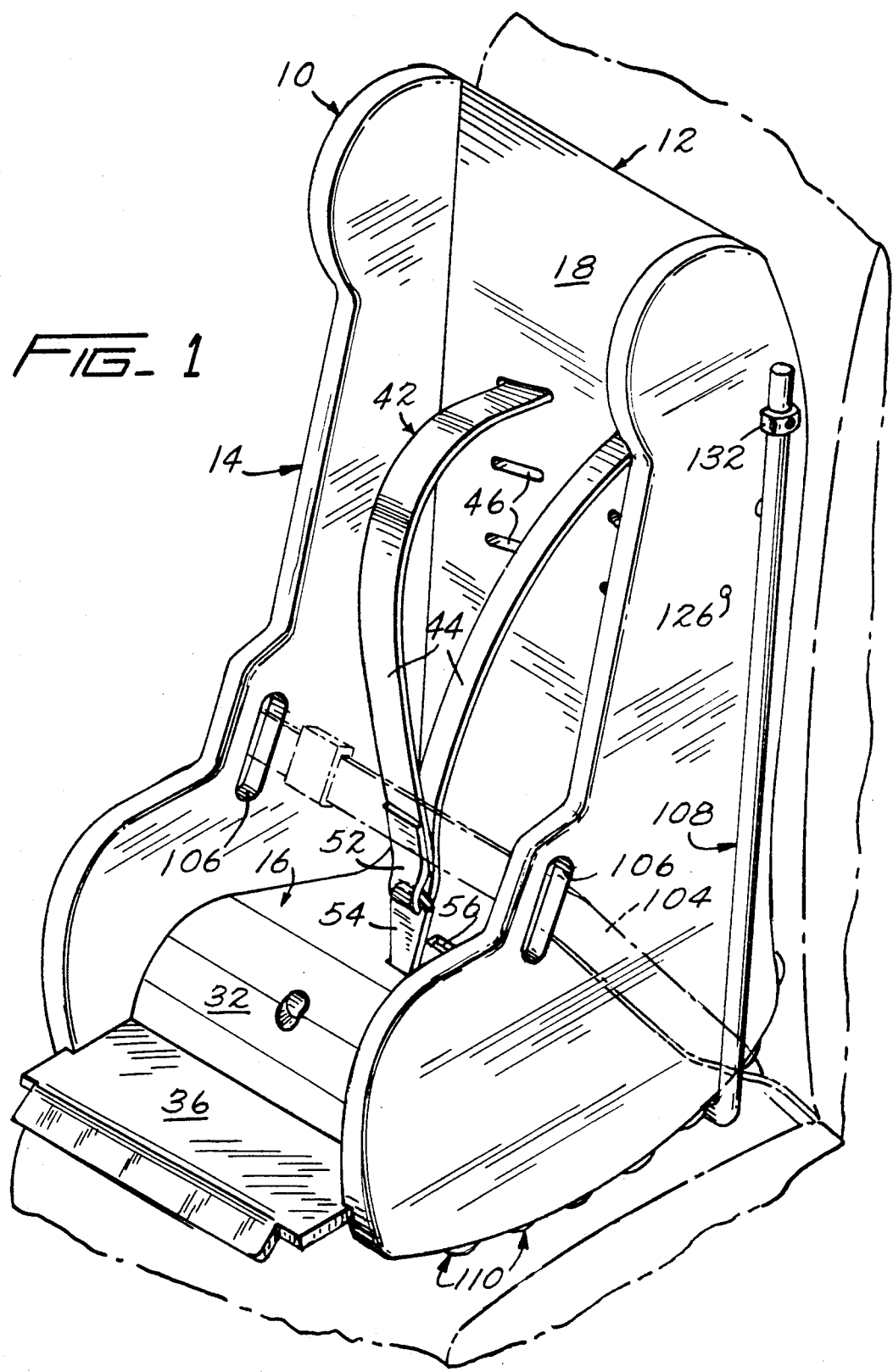

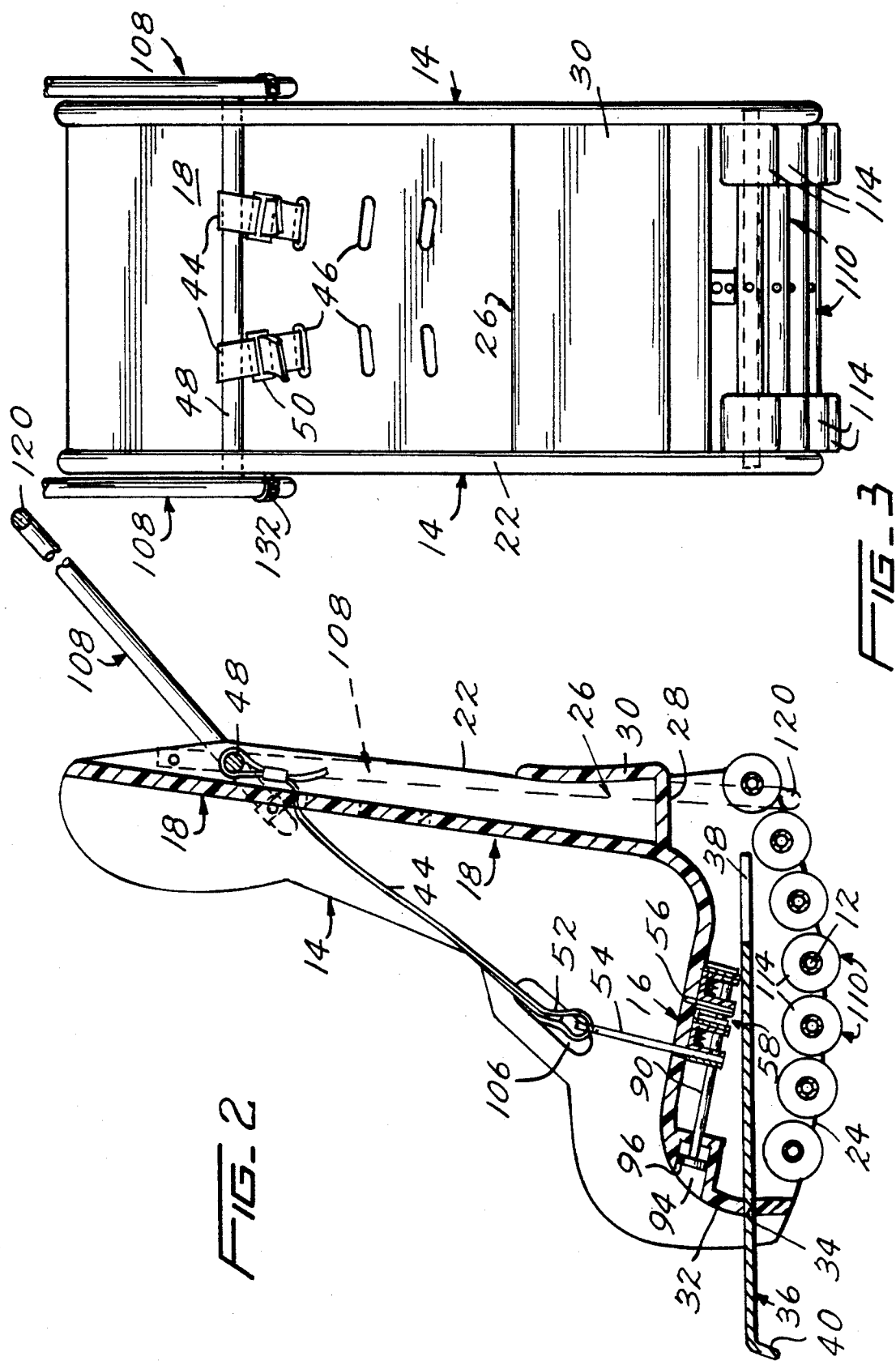

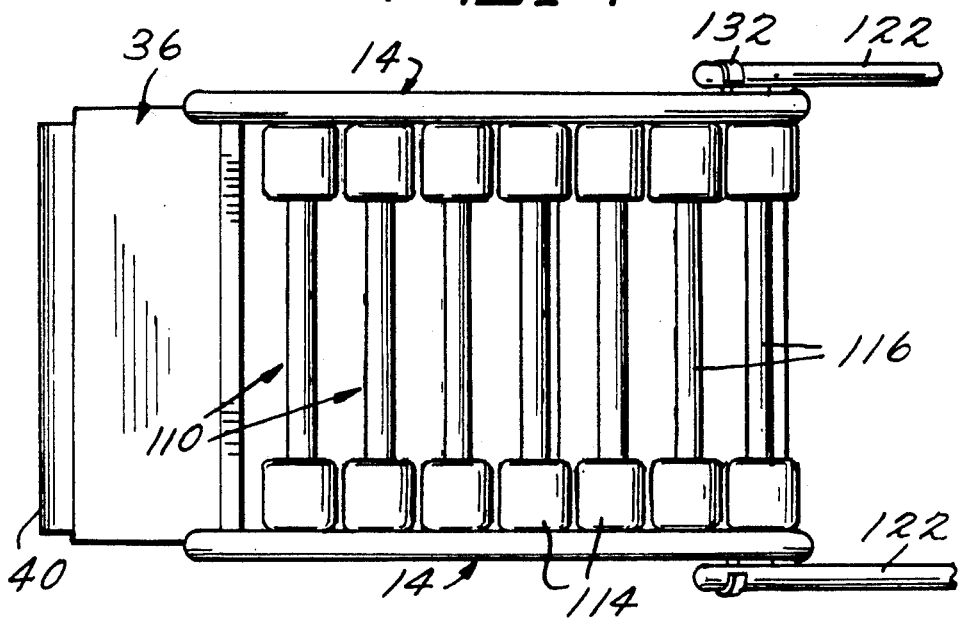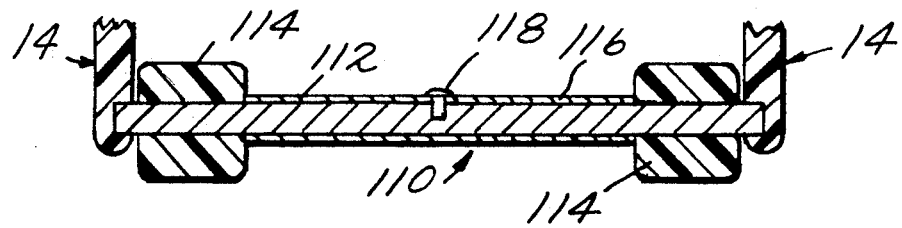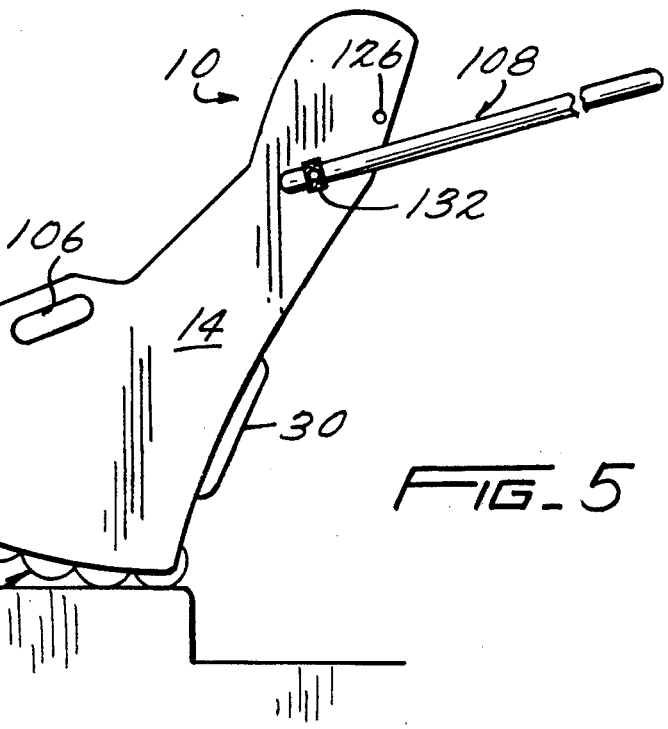

5,022,669

CHILD TRAVEL SEAT

BACKGROUND OF THE INVENTION

Car seats for receiving and restraining young children within automobiles, trucks and the like have been known and have made a substantial contribution to child safety for a number of years.

More recently, the patent art has evidenced an increased interest in extending the versatility of such seats by the incorporation therewith of means for converting the seat to alternate use as a stroller through the provision of appropriate wheel means which are selectively extended or retracted, or otherwise removably attached when the stroller configuration is desired.

There has also been recent interest in the desirability of extending the use of basic childrens' car seats to other modes of transportation. This is evidenced by a recent recommendation of the National Transportation Safety Board that small children be required to sit in specially designed child restraint seats during airline flights. The provision of an appropriate travel seat for use in an aircraft presents particular problems arising from the relatively confining width of the aircraft aisles and seats. In addition, as an airport environment frequently involves the bothersome handling of luggage, long walks down the concourses and the like, it would be particularly desirable to provide a travel seat which is also convertible to a stroller. This convertibility obviously increases the difficulties of accommodating the seat/stroller within the aircraft itself.

SUMMARY OF THE INVENTION

The present invention is a travel seat which, while usable as a car seat, is particularly for use as a child restraining device removably positionable upon an aircraft seat. In conjunction therewith, it is also an object of the invention to provide such a child travel seat which is simply and easily converted to a child stroller specifically for use by a luggage-burdened parent within the hustle and bustle of an airport as well as in the aisle of the aircraft itself.

A particularly significant feature of the travel seat of the present invention is the conversion thereof to a stroller without the complex wheel manipulation heretofore required for such devices.

The child travel seat includes a shell of molded plastic or the like which may be padded for enhanced comfort for the child. The shell includes a pair of laterally spaced side walls with a back panel and seat panel mounted therebetween. The side walls extend below the seat panel to define a base, and terminate in arcuate lower edges. A series of wheel assemblies extend between the lower portions of the side walls along the arced lower edges thereof and mount a series of ground engaging rollers, the peripheries of which project sufficiently below the lower side wall edges as to provide for a free wheeling support for the travel seat. The arcuate alignment of the wheel assemblies is such so as to normally engage at least two assemblies with the floor for a stable support of the seat when used as a stroller with the handle extended.

The wheel assemblies are permanently positioned to provide for conversion between a travel seat and a stroller by the simple expedient of pivoting the handle from its stored position to its extended position. The low profile of the projecting rollers is easily sufficient to accommodate smooth airport floors with the arcuate arrangement of the wheel assemblies allowing for ready movement over floor irregularities and curbs or steps as may be encountered. Similarly, the lower projecting profile of the rollers allows the seat to be positioned on an airplane seat with the rollers slightly depressing the aircraft seat and with the arcuate lower edges of the side walls providing a stable non-shifting base. The travel seat will of course be further secured by appropriate belting, for example the seat belt conventionally provided with the aircraft seat. Similarly, the travel seat incorporates a child restraining harness engageable over the shoulders of a seated child and releasably locked within appropriate latch means accessible directly through the seat portion or panel between the legs of the child.

Other objects and advantages of the invention will become apparent from the more detailed description of the construction and manner of use of the invention following hereinafter.

BRIEF DESCRIPTION OF THE DRAWINGS

FIG. 1 is a perspective view of the child travel seat mounted on an aircraft seat;

FIG. 2 is a vertically cross-sectional view through the seat positioned for use as a stroller;

FIG. 3 is a rear elevational view of the seat;

FIG. 4 is a bottom plan view of the seat;

FIG. 5 is a side elevational view of the stroller illustrating its adaptability to move over curbs and the like;

FIG. 6 is an enlarged longitudinal cross-sectional view through one of the wheel assemblies;

DESCRIPTION OF PREFERRED EMBODIMENTS

Figure 7:
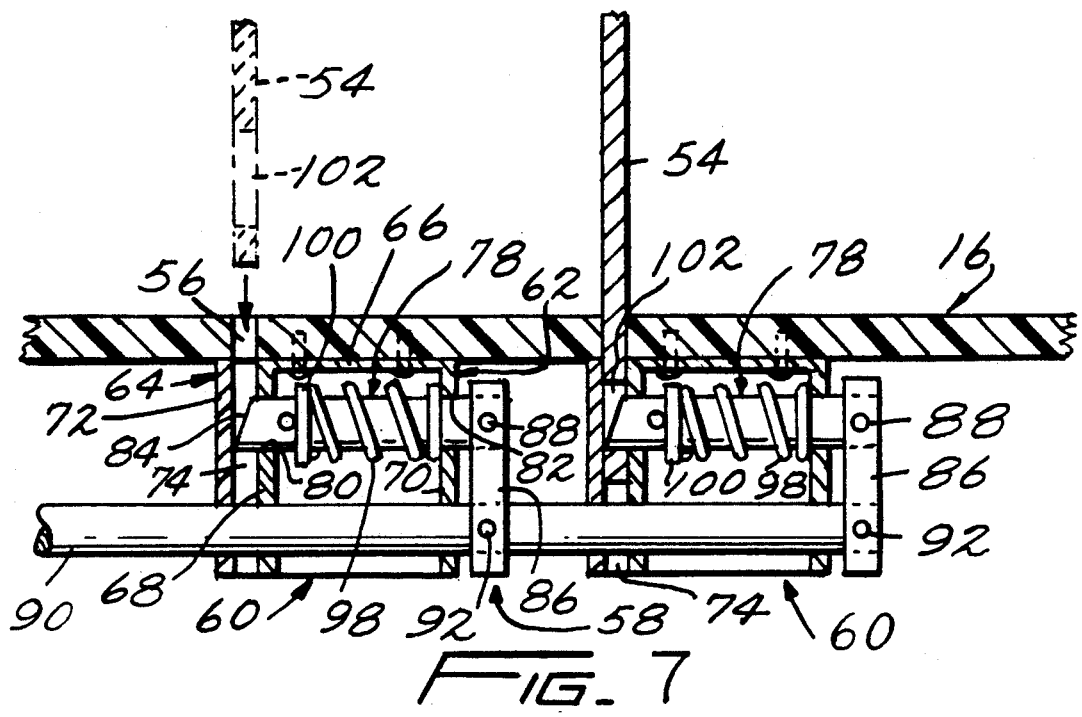
FIG. 7 is an enlarged cross-sectional detail through the harness latch assembly.

Referring more specifically to the drawings, the child travel seat 10 includes a seat-defining shell 12 which, while not limited thereto, may be molded in one piece of an appropriate high impact synthetic resinous material. The shell 12 includes a pair of laterally spaced side walls 14 with a seat portion or panel 16 and back portion or panel 18, preferably formed as one piece, extended between the side walls 14.

Noting FIG. 2 in particular, the vertical back portion 18 is forwardly spaced or offset from the substantially vertical rear edges 22 of the side walls 14. Similarly, the side walls 14 extend vertically below the seat portion 16 and terminate in lower edges 24 following a low convex arc relative to the horizontal, that is an arc with a substantially remote center of rotation, for example at a distance approximately equal to the height of the travel seat 10.

A storage bin 26 is formed between the side walls 14 immediately to the rear of the lower portion of the back 18, and consists of a bottom panel 28 extending rearwardly from the back 18 to approximately the rear edges 22 of the side walls 14, and a vertical rear panel 30 extending upwardly from the rear edge of the bottom panel 28 to define an open-topped bin along the full width between the side walls 14.

The seat panel 16, along the forward portion thereof, is integrally formed, along an arcuate transition area, with a depending front panel 32 which similarly extends transversely between the opposed side walls 14. The front panel 32, at a point slight below mid-height thereof, is provided with a full width slot 34 which slidably receives a planar foot tray 36 therethrough. The opposed edges of the foot tray 36 are slidably received within elongate front-to-rear grooves 38 provided within the inner faces of the opposed side walls 14 below the seat panel 16 to act as a support and guide for the selective rearward and forward sliding of the foot tray 36. It is contemplated that the length of the opposed side grooves 38 be related to the depth of the foot panel 36 to allow for a substantially complete retraction thereof to a point generally inward of the front edges of the side walls 14. Frictional engagement between the opposed edges of the foot tray 36 and the grooves 38 will be such as to allow for a manual adjustment of the foot tray 36 and a maintenance of the foot tray in any adjusted position thereof. As desired, the foot tray 36 can have a depending forward lip 40. Further, an appropriate stop, for example a projecting abutment on the foot panel 36 inward of the front panel 32 can be provided to limit the forward outward drawing of the foot tray 36.

In order to secure a child within the travel seat 10, the travel seat is provided with a harness 42 preferably consisting of a pair of shoulder straps 44, the upper ends of which are engaged through laterally spaced slots 46 provided through the back 18 at a height to accommodate a child's shoulders therebelow. As illustrated in the drawings, a number of vertically spaced pairs of slots 46 can be provided to accommodate children of different heights. The extreme upper ends of the straps 44, after passing through an aligned pair of slots 46, mount to a transverse rod-like belt anchor 48 by appropriate buckles 50 through which the end portions of the belts or straps 44 are adjustably engaged for a selective varying of the length of the straps 44.

The lower ends of the straps 44, as at 52, are secured to and mount a rigid locking plate 54. The locking plate 54, after engagement of the harness 42 over the shoulders of a seated child, is vertically introduced through one of two slots 56 centrally within the seat portion 16 and into releasable locking engagement with a latching mechanism 58. The specific slot 56 through which the plate 54 engages will be determined by the size of the child.

Figure 8:
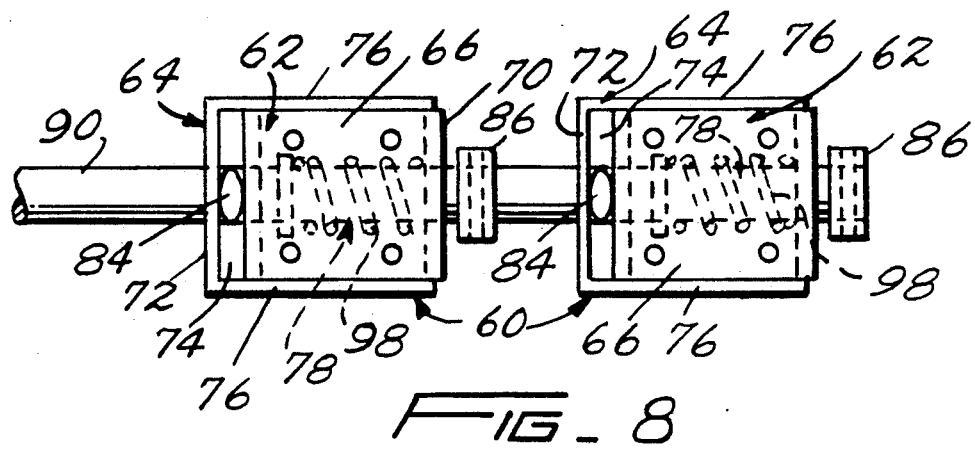
FIG. 8 is a top plan view of the latch assembly.

The latching mechanism 58, noting FIGS. 7 and 8 in particular, consists of two aligned latches 60, each including inner and outer U-shaped body members 62 and 64. The inner member 62 has the bight portion 66 thereof bolted or otherwise rigidly affixed to the under surface of the seat portion 16 of the travel seat with the legs 68 and 70 thereof defining front and rear legs relative to the front and rear of the travel seat.

The second U-shaped member or bracket 64 of each latch 60 is positioned at right angles to the companion first bracket 62 with the bight portion 72 of the bracket 62 positioned in parallel forwardly spaced relation to the front leg 68 of the bracket 60 to define a vertical slot 74 therebetween aligned with one of the seat panel slots 56 for the selective reception of the locking plate 54 therein. The opposed legs of the forward bracket 64 extend rearwardly and overlie the edges of the vertical legs 68 and 70 of the inner bracket 62 and are welded or otherwise affixed thereto to define the body of the latch with the vertical locking plate slot 74 therein.

Each of the latches 60 includes an elongate latch bolt 78 slidably received through aligned apertures 80 and 82 in the front and rear legs 68 and 70 of the inner bracket 62. The leading end 84 of each latch bolt 78 is beveled with the bevel upwardly directed. The rear end portion of the latch bolt 78 extends rearwardly beyond the rear leg 70 of the inner bracket 62 and is fixed to the upper portion of a rigid post 86, for example by being received within a hole within a post and affixed therein by a transverse pin 88. The lower ends of the two posts 86, one associated with each latch bolt 78 of the two latches 60, are secured to a common elongate control rod 90. The engagement with the control rod can be in any appropriate manner. For example, the control rod can be extended through an aperture in the forwardmost post 86 and into a socket in the rear post 86 with the posts 86, in each instance, being affixed to the control rod 90 by a transverse pin 92.

The control rod 90 extends through front-to-rear aligned apertures in the two latches 60, that is through apertures in the aligned front and rear legs 68 and 70 of the inner bracket 62 and the bight 72 of the outer bracket 64, thus supporting the control rod for sliding reciprocating and a corresponding sliding reciprocation of the latch bolts 78 secured thereto.

For manipulation, the control rod extends forwardly through the front panel 32 of the seat and into a recess 94 defined therein. Within the recess, the control rod is provided with an enlarged push button head 96 which, while accessible, does not interfere with the desired smooth surface of the smooth seat.

The latching mechanism 58 is intended to automatically engage an inserted locking plate and retain the locking plate until manually released. As such, each latch bolt 78 is spring loaded or spring biased forwardly by an encircling compression spring 98 engaged, at the rear thereof, with the inner face of the rear leg 70 of the inner latch bracket 62 and, at the forward end thereof, with a collar 100 fixed to the corresponding latching bolt 78 sufficiently inward of the beveled leading end 84 thereof and rearward of the forward leg 68 of the inner bracket 62 to extend the beveled leading end 84 completely across the vertical slot 74 which receives the locking plate. In use, and as suggested in FIG. 7 in particular, the locking plate 54, with a bolt receiving opening 102 therethrough, is vertically introduced into one of the latch channels 74 through a corresponding seat slot 56. The locking plate 54, upon engaging the beveled leading end 84 of the latch bolt, will rearwardly force the latch bolt against the spring 98 until the latch bolt aligns with the locking plate opening 102. At that point, the latch bolt 78 is returned to its fully extended position and the locking plate 54 is secured until manually released by an inward movement of the control rod 90 responsive to an inward push on the control rod button 96 at the front of the travel chair seat.

Noting FIG. 1, when the child travel seat is mounted to an airplane seat or the like, a seated child will be additionally restrained by the conventionally provided seat belt 104 engaged through a pair of elongate openings 106 inward of the forward edges of the opposed side walls 14. In this manner, it will be appreciated that the travel seat itself will be positively retained in position. In addition, by forming the openings 106 as slightly elongate slots, and positioning the openings 106 at approximately the center of gravity of a child seated within the travel seat, the openings 106 will form convenient hand holds for a carrying of the travel seat.

A significant feature of the invention is the adaptability of the child travel seat 10 for use as a stroller with the conversion to a stroller requiring only the simple pivotal manipulation of the handle 108 from a retracted stored position to an extended in use position. The carriage assembly which adapts the travel seat for use as a stroller is permanently mounted and constructed to require no manipulation relative to the seat-forming shell when the travel seat is to be propelled over a floor surface in the manner of stroller.

The stroller-defining carriage assembly consists of multiple wheel assemblies 110 mounted within the base of the travel seat 10 below the seat portion 16 and between the lower portions of the side walls 14. Each wheel assembly 110 comprises an elongate shaft or axle 112 having the opposed ends thereof secured to the lower edge portions of the opposed side walls 14 immediately above the arcuate or convex lower edges 24. The shaft 112 rotatably mounts a pair of rollers 114, which may include appropriate bearings, one immediately inward of each of the side walls 14. The rollers 114 are in turn retained in position on the shaft 112 by a central sleeve 116 engaged about the shaft 112 between the rollers 114 and fixed to the shaft by an appropriate pin, screw, or the like 118.

The positioning of the wheel assembly shaft 112 and the diameter of the rotatably mounted rollers 114 are such whereby the rollers radially extend below the arcuate lower edges 24 of the side walls 14 to expose a segment of the rollers 114, slightly less than ⅓ the circumference of the rollers, for direct seat-supporting engagement with the floor or ground surface.

The wheel assemblies 110 are positioned in spaced parallel relation to each other, each extending between and being supported by the opposed base portions of the side walls 14 and aligned, one behind the other, for substantially the full depth of the travel seat along the arcuate lower edges 24 and of equal height relative to the lower edges to follow a complementary arcuate curvature. The lower extremes of the rollers 114 thereby define an arc duplicating that of the lower edges 24. It is preferred that the travel seat incorporate seven wheel assemblies. However, as few as three wheel assemblies can be utilized.

The low profile of the exposed portions of the wheel assemblies or rollers 114 thereon is significant in allowing for a direct seating of the travel seat on an airplane seat or the like as suggested in FIG. 1 without a necessity for a retraction of the wheel assemblies. The travel seat rollers 114, will, because of the low profiles thereof, easily sink within the seat cushion, and with the arcuate lower edges 24 of the side walls 114 provide for a wide distribution of the weight of the travel seat and the child. As will be appreciated from the drawings, the rollers 114 are relatively wide and provided with slightly rounded peripheral edges for ease of movement over a floor surface or the like, and to also allow for a positive seating on an airplane seat without possibility of damage thereto. It will also be noted that the wheel assemblies are effectively shielded from the child's legs and feet by the front seat panel 32 and the foot tray 36.

The provision of multiple wheel assemblies along a defined low or gentle arc is particularly significant in that the resultant rolling support provides advantages normally associated with large diameter wheels without the height of such wheels, the attendant space requirements and the necessity to collapse or otherwise store the wheels. For example, noting FIG. 5, the stroller, through a slight elevation of the forward portion of the travel seat, can easily move over curbs, bumps, stairs and the like with the elevated forward wheel assemblies, once positioned on the upper level, providing a positive support as the rear of the travel seat is lifted. The arc of the lower exposed extremities of the rollers 114 normally provides for engagement of at least two of the wheel assemblies with the floor when traveling over a flat surface. It will also be noted, the arc provides what might also be considered as rocking base for the travel seat, whereby the travel seat, with the extended handle 108, can be gently rocked to soothe a restless child particularly during the frequently encountered delays at airplane terminals.

The handle 108, includes a handle bar 120 extending transversely across the back of the travel seat 10 and a pair of projecting side rods 122 integral with or otherwise rigidly fixed to the opposed ends of the handle bar 120. The side rods 122 terminate in free ends, and, at points inwardly spaced from the free ends, are each pivotally mounted to the opposed side walls 14 or, as suggested in FIGS. 2 and 3, projecting ends of the cross rod 48 which mounts the harness straps 44.

The pivotally mounted handle 108 swings between a stored or collapsed position wherein the handle bar 120 is positioned between and generally below the two rearmost wheel assemblies 110 as illustrated in phantom lines in FIG. 2 and in full lines in FIG. 1, and an extended in use position projecting rearwardly and upwardly at a comfortable angle as illustrated in FIGS. 2 and 5.

Figure 9:
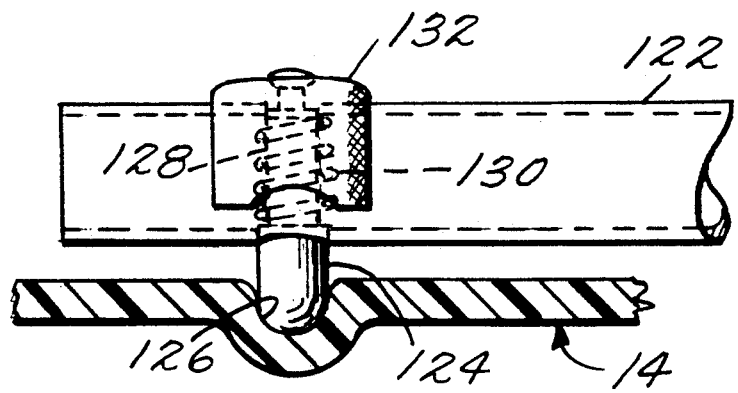
FIG. 9 is a detail, partially in section, of the spring means utilized to releasably retain the handle in either its folded position or its extended position.

Each handle side rod 122, between the pivotal mounting thereof and the free end, is provided with a spring loaded lug 124, the details of which will be noted in FIG. 9. The lug 124 projects inwardly toward the outer surface of the corresponding side wall 14. The side wall 14 in turn includes a pair of cooperating sockets 126 forming, with the lug 124, detents for releasably retaining the handle. The sockets 126, noting FIGS. 1 and 5, are positioned to releasably lock the handle 108 in either of the two positions thereof.

As suggested in FIG. 9, the lug includes a stem 128 extending through aligned apertures in the corresponding side rod 122. A coiled compression spring 130 within the rod is engaged about the stem 128 with the outer end of the spring seated against the enlarged head portion of the lug 124 and the inner end of the spring seated against the remote inner wall of the side rod 122. In order to facilitate a manipulation of the lug 124, and in particular a retraction thereof for movement out of the sockets 126, a gripping knob 132 will be fixed to the end of the lug stem 128 remote from the projecting end of the lug 24. The knob 132 overlies the outer portion of the corresponding side rod 122 for simple access thereto by the fingers of the user. With the opposed lugs 124 retracted by the two hands of the user, the handle 108 can easily be pivoted in the desired direction. Once the lugs 124 have been moved from the sockets 126, the knobs can be released with the convex outer surfaces of the lugs easily riding over the outer faces of the side walls 14 until aligned with the desired sockets 126 at which point the lugs are spring-extended into the sockets and the handle 108 fixed in position. It is to be appreciated that the engagement of the lugs 124 in the corresponding recesses 126 provides for a rigid interlock, particularly in the stroller configuration, to allow for a full manipulation of the travel seat from the handle in the manner of a standard stroller.

From the foregoing, it will be recognized that a unique child travel seat has been described. Of particular significance is the capability of the travel seat to instantly be converted into a stroller configuration by the sole expedient of pivoting the stroller handle from a collapsed inactive position to an outwardly extending position. There is no necessity to remove the child from the seat or manipulate the seat, and in particular, the wheel assemblies thereof, in any manner.

I claim:

1. A child's travel seat selectively convertible to use as a stroller and comprising opposed vertical sides with forward and rear edge portions defining the front and rear of the travel seat, a seat portion extending rearwardly relative to the front of said travel seat, and a back portion extending upwardly from said seat portion, said seat and back portions extending between and mounted to said sides, said sides depending below said seat portion and terminating in lower edges, said sides below said seat portion defining a base, at least three wheel assemblies mounted within said base at a fixed height relative to said lower edges, said wheel assemblies each including at least one roller with a ground engageable periphery having a portion thereof below said lower edges, and handle means adjustably fixed to said sides upwardly spaced from said seat portion for movement between a collapsed position immediately adjacent said back portion, and an extended position projecting outwardly at an angle to said back portion, said wheel assemblies extending between and mounting to said opposed sides, said wheel assemblies being in parallel spaced lateral alignment with each other along an arc extending rearward relative to the front of said travel seat for an engagement of selected wheel means with a flat support surface upon a forward to rearward rocking of said travel seat, said side lower edges being convex and define low arcs, the engagement of said wheel assemblies with said opposed sides being at equal heights above said convex lower edges to define said arc of said laterally aligned wheel assemblies.

2. The child's travel seat of claim 1 wherein each wheel assembly includes a shaft having opposed ends engaged with said opposed sides adjacent said lower edges thereof, said at least one roller comprising a pair of rollers, one rotatably mounted on said shaft adjacent each side, and means retaining said rollers adjacent the respective sides.

3. The child's travel seat of claim 1 including seven of said wheel assemblies laterally aligned along said arc of said wheel assemblies.

4. The child's travel seat of claim 3 wherein said handle means comprises a pair of side rods having inner end portions pivotally mounted to said opposed sides, and outer ends interconnected by a transverse handle bar, said handle bar, in said collapsed position, being positioned generally between the rearmost wheel assembly and the adjacent wheel assembly forward thereof, and releasable detent means between said side rods and said sides for securing said handle means in each of said positions.

5. The child's travel seat of claim 4 including a child restraining shoulder harness, slot means through said back portion vertically spaced above said seat portion, said harness including an upper end portion received through said slot means, and anchor means immediately rearward of said back portion for anchoring the upper end portion of said harness, said harness including a lower end portion with a locking plate mounted thereto, slot means through said seat portion for selectively receiving said locking plate therethrough, and latch means mounted to and below said seat portion for releasably receiving and retaining said locking plate.

6. The child's travel seat of claim 5 wherein said slot means in said seat portion comprise a pair of spaced slots, one spaced rearward of the other, said latch means comprising a latch aligned with each slot of said pair of spaced slots.

7. The child's travel seat of claim 6 wherein each latch includes a latch bolt spring biased to a locking position, and a common control rod for retracting both latch bolts to a release position.

8. The child's travel seat of claim 7 including a foot tray slidably mounted between said sides below said seat portion for manual forward and rearward movement thereof between a forward position forward of said seat portion and a rearward position underlying said seat portion.

9. The child's travel seat of claim 8 including an open top receptacle defined between said sides immediately rearward of said back portion.

10. A child's travel seat selectively convertible to use as a stroller and comprising opposed vertical sides with forward and rear edge portions defining the front and rear of the travel seat, a seat portion extending rearwardly relative to the front of said travel seat, and a back portion extending upwardly from said seat portion, said seat and back portions extending between and mounted to said sides, said sides depending below said seat portion and terminating in lower edges, said sides below said seat portion defining a base, multiple wheel assemblies mounted within said base at a fixed height relative to said lower edges, said wheel assemblies each including at least one roller with a ground engageable periphery having a portion thereof below said lower edges, and handle means adjustably fixed to said sides upwardly spaced from said seat portion for movement between a collapsed position immediately adjacent said back portion, and an extended position projecting outwardly at an angle to said back portion, said multiple wheel assemblies extending between and mounting to said opposed sides, said wheel assemblies being in parallel spaced lateral alignment with each other along an arc extending rearward relative to the front of said travel seat for an engagement of selected wheel means with a flat support surface upon a forward to rearward rocking of said travel seat, said handle means comprising a pair of side rods having inner end portions pivotally mounted to said opposed sides, and outer ends interconnected by a transverse handle bar, said handle bar, in said collapsed position, being positioned generally between the rearmost wheel assembly and the adjacent wheel assembly forward thereof, and releasable detent means between said side rods and said sides for securing said handle means in each of said positions.

11. A child's travel seat selectively convertible to use as a stroller and comprising opposed vertical sides with forward and rear edge portions defining the front and rear of the travel seat, a seat portion extending rearwardly relative to the front of said travel seat, and a back portion extending upwardly from said seat portion, said seat and back portions extending between and mounted to said sides, said sides depending below said seat portion and terminating in lower edges, said sides below said seat portion defining a base, multiple wheel assemblies mounted within said base at a fixed height relative to said lower edges, said wheel assemblies each including at least one roller with a ground engageable periphery having a portion thereof below said lower edges, handle means adjustably fixed to said sides upwardly spaced from said seat portion for movement between a collapsed position immediately adjacent said back portion, and an extended position projecting outwardly at an angle to said back portion, a child restraining shoulder harness, slot means through said back portion vertically spaced above said seat portion, said harness including an upper end portion received through said slot means, and anchor means immediately rearward of said back portion for anchoring the upper end portion of said harness, said harness including a lower end portion with a locking plate mounted thereto, slot means in said seat portion for selectively receiving said locking plate therethrough, and latch means mounted to and below said seat portion for releasably receiving and retaining said locking plate, said slot means in said seat portion comprising a pair of spaced slots, one spaced rearward of the other, said latch means comprising a latch aligned with each slot of said pair of spaced sots, each latch including a latch bolt spring biased to a locking position, and a common control rod for retracting both latch bolts to a release position.

12. A child's travel seat adaptable for use as a stroller and comprising opposed side walls with combined seat and back portions mounted therebetween, said side walls having convex lower edges, and multiple fixed position wheel assemblies mounted between said side walls in laterally spaced relation to each other and aligned along an arc paralleling said convex lower edges, said wheel assemblies having wheel means with peripheries which, for a minor portion thereof, extend below said convex lower edges, and handle means adjustably fixed to said side walls and moveable between a position immediately adjacent said back portion and a position outwardly extending from said back portion, said multiple wheel assemblies including at least three laterally spaced wheel assemblies.

13. The child's travel seat of claim 12 wherein said sidewalls and said combined seat and back portions comprise a molded plastic shell.

14. A child's travel seat adaptable for use on a vehicle seat and as a stroller and comprising opposed sides with seat and back portions mounted therebetween, said sides having lower portions for engagement with a vehicle seat and at least three fixed position wheel assemblies mounted between said sides in laterally spaced relation to each other and aligned along an arc generally along said lower portions, said wheel assemblies having wheel means with peripheries which, for only a portion thereof, extend below said lower portions and which present lowermost extremes along an arc paralleling the arc of the wheel assemblies to define a generally arcuate rolling support for use of the travel seat as a stroller.

15. The child's travel seat of claim 14 wherein said lower portions of said sides are arcuate and parallel the arc of the wheel assemblies to provide support edges engageable with a vehicle seat, said wheel assemblies presenting low profiles below said arcuate edges.

16. The child's travel seat of claim 15 including adjustably mounted handle means moveable between a collapsed position retracted relative to said back portion for use of the travel seat on a vehicle seat, and a position outwardly extending from said back portion for use of the travel seat as a stroller.

17. A child's travel seat selectively convertible for use on a vehicle seat and for use as a stroller and comprising opposed vertical sides with forward and rear edge portions defining the front and rear of the travel seat, a seat portion extending rearwardly relative to the front of said travel seat, and a back portion extending upwardly from said seat portion, said seat and back portion extending between and mounted to said sides, said sides depending below said seat portion and terminating in lower edges, said sides below said seat portion defining a base, multiple wheel assemblies mounted on said base at a fixed height relative to said lower edges, said wheel assemblies each including at least one roller with a ground engageable periphery having a portion thereof below said lower edges, and handle means adjustably mounted in upwardly spaced relation to said seat portion for movement between a collapsed position immediately adjacent said back portion, and an extended position projecting outwardly at an angle to said back portion, said multiple wheel assemblies extending between and mounting to said opposed sides, said wheel assemblies being in parallel spaced lateral alignment with each other along an arc extending rearward relative to the front of said travel seat for an engagement of selected wheel means with a flat support surface upon a forward to rearward rocking of said travel seat, said handle means comprising an outer portion with a transverse handle bar, said handle bar, in said collapsed position, being positioned generally between the rearmost wheel assembly and the adjacent wheel assembly forward thereof for accommodation of the travel seat on a vehicle seat, and releasable means for securing said handle means in each of said positions.

18. A child's travel seat comprising opposed vertical sides with forward and rear edge portions defining the front and rear of the travel seat, a seat portion extending rearwardly relatively to the front of said travel seat, and a back portion extending upwardly from said seat portion, said seat and back portions extending between and mounted to said sides, said sides depending below said seat portion and defining a base, a child restraining shoulder harness, slot means in said back portion vertically spaced above said seat portion, said harness including an upper end portion received through said slot means, and anchor means rearward of said back portion for anchoring the upper end portion of said harness, said harness including a lower end portion with locking plate means mounted thereto, slot means in said seat portion for selectively receiving said locking plate means therethrough, and latch means mounted to and below said seat portion for releasably receiving and retaining said locking plate means, said slot means in said seat portion comprising a pair of spaced slots, one spaced rearward of the other, said latch means comprising a latch aligned with each slot of said pair of spaced slots, each latch including a latch bolt biased to a locking position, and a common control element for retracting both latch bolts to a release position.

* * * * *